United States Patent [19]
Breitholtz et al.

[11] 3,799,339
[45] Mar. 26, 1974

[54] ROCK TRAP FOR CONVEYOR TUBE

[75] Inventors: Claes Breitholtz, Sollentuna; Gunnar Lindberg, Jarfalla, both of Sweden

[73] Assignee: Rader Companies, Inc., Porland, Oreg.

[22] Filed: Apr. 13, 1973

[21] Appl. No.: 351,091

[52] U.S. Cl............................... 209/115, 209/135
[51] Int. Cl............................................. B07b 3/00
[58] Field of Search ........... 209/115, 134, 135, 136, 209/137

[56] References Cited
UNITED STATES PATENTS

| | | | |
|---|---|---|---|
| 1,221,110 | 4/1917 | Torrence | 209/115 |
| 1,792,962 | 2/1931 | Barker | 209/135 |
| 2,978,103 | 4/1961 | Cowher, Sr. | 209/135 |

Primary Examiner—Allen N. Knowles
Attorney, Agent, or Firm—Klarquist, Sparkman, Campbell, Leigh, Hall & Whinston

[57] ABSTRACT

A rock trap is described for removing rocks and other heavy foreign objects from particulate material transmitted through a conveyor tube by a conveyor fluid, such as air. The particulate material is injected into the conveyor tube through an inlet openng at the top thereof, intermediate the ends of such tube, and the rock trap is positioned beneath and downstream from such inlet opening. A baffle plate is provided in the conveyor beneath the inlet opening so that such baffle plate extends longitudinally in the tube across such inlet opening and terminates above the top opening of the rock trap pocket. Rocks and other heavy foreign objects in the particulate material strike the baffle plate and roll and slide off the end of such plate into the rock trap pocket. The conveyor fluid is transmitted through the tube both above and below the baffle plate, and the conveyor fluid under such properly positioned plate flows across the top of the rock trap to prevent the particulate material from falling into such trap, while enabling rocks and other foreign objects to fall into such trap.

10 Claims, 4 Drawing Figures

PATENTED MAR 26 1974　　　　　　　　　3,799,339
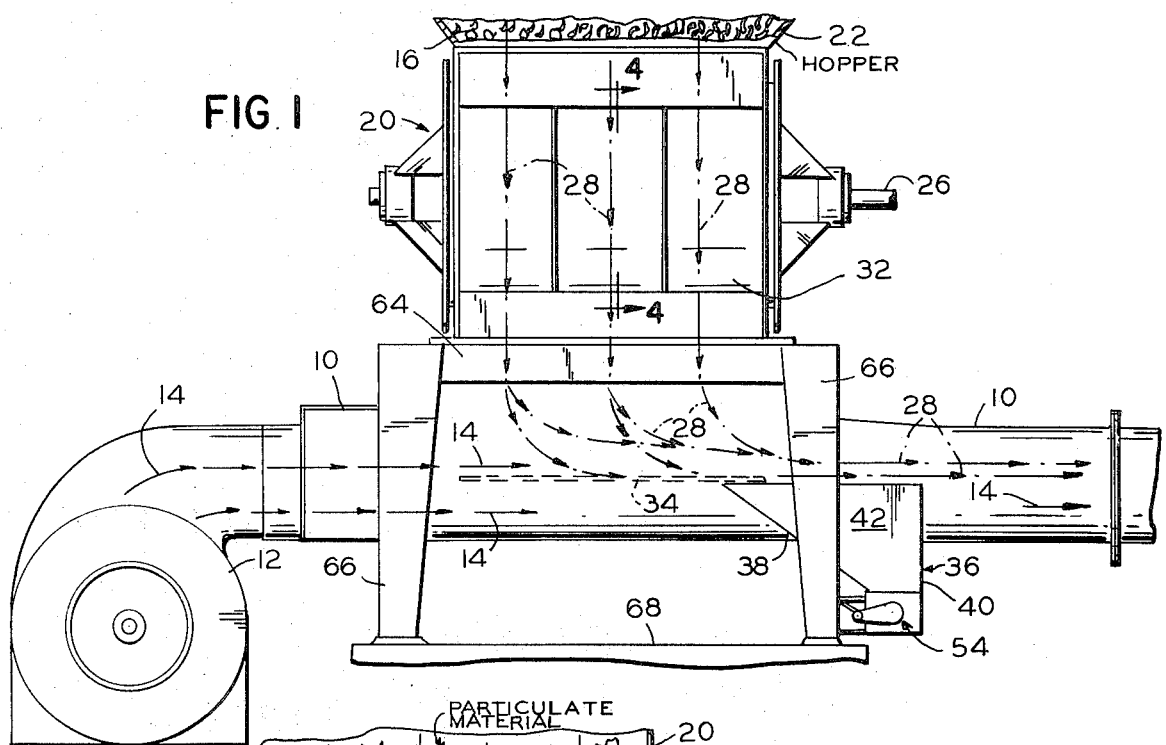
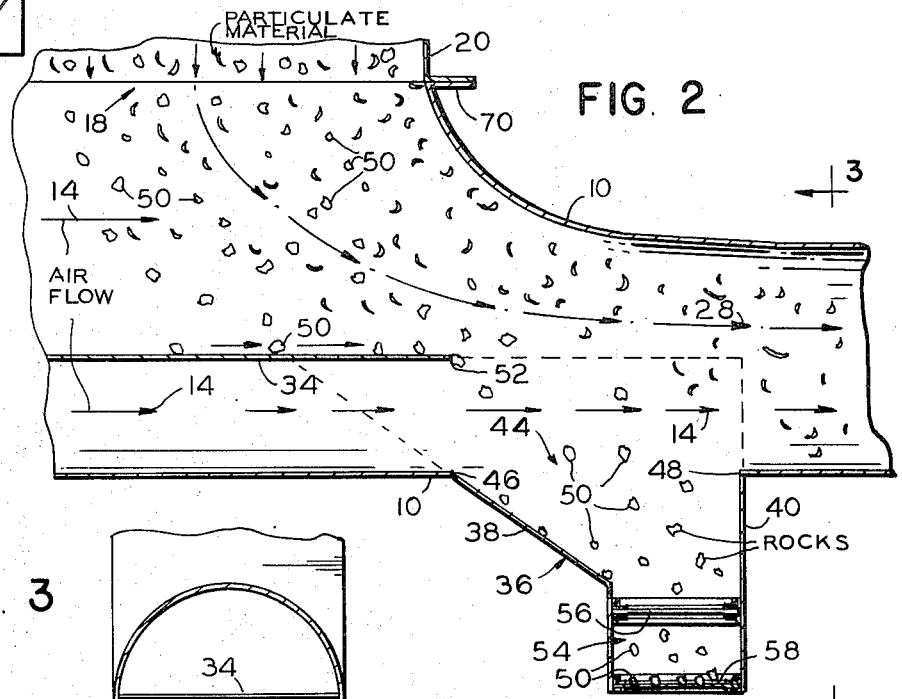
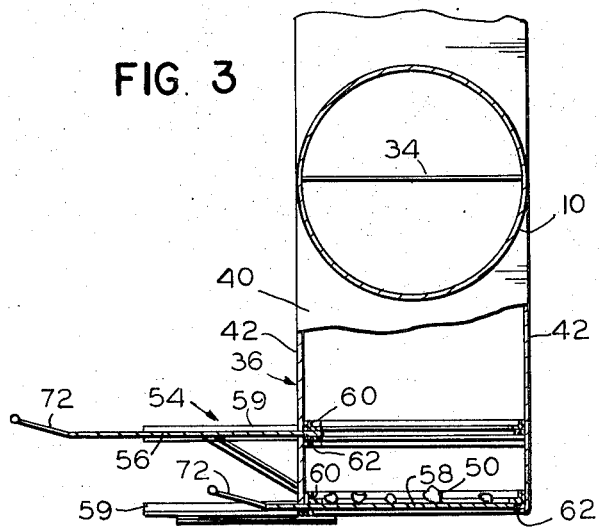
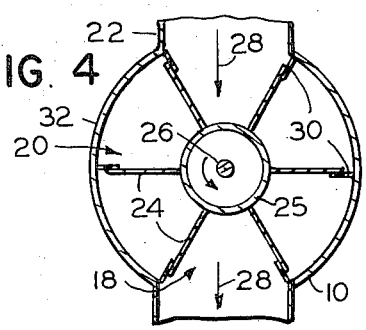

3,799,339

ROCK TRAP FOR CONVEYOR TUBE

BACKGROUND OF THE INVENTION

The subject matter of the present invention relates generally to apparatus for removing rocks and other high density materials and objects from low density particulate material transmitted through a conveyor tube, and in particular to a rock trap for such a conveyor tube into which the particulate material is injected through an inlet opening at the top of the tube. The rock trap is positioned beneath and downstream from the inlet opening and a baffle plate extends longitudinally within the tube beneath and across such inlet opening, such plate terminating above the top opening of such rock trap. A conveyor fluid, such as air, is transmitted through the conveyor tube above and below the baffle plate, so that the fluid below the plate flows across the top of the rock trap, to prevent the particulate lower density material from falling into such trap. The rock trap apparatus of the present invention is especially useful in removing rocks and other foreign objects of higher density from wood chips or other particulate material transmitted through a pneumatic conveyor tube.

Previous gravity rock trap apparatus, such as that shown in U. S. Pat. No. 669,182 of R.J. Reynolds, granted Mar. 5, 1901, and U.S. Pat. No. 730,229 of J. T. Burr, granted June 9, 1903, were inefficient because they employ baffle means which extend completely across the top of the rock trap to prevent entry of the conveyed material, so that any rocks collected must fall backward through a passageway in order to enter the rock trap. As a result of this inefficient operation, a series of rock traps were usually employed successively spaced along the conveyor tube to collect most of the rocks. The rock trap apparatus of the present invention is more efficient because the baffle plate only covers a small portion of the top opening of the rock traps. However, this tends to cause a large amount of the particulate material being conveyed to also fall into the trap, which of course is undesirable. This problem has been overcome by causing a portion of the air or other conveyor fluid flowing above the baffle plate to be transmitted beneath the baffle plate and across the top of the trap, which prevents the particulate material from falling into the trap, due to its being of lower density and lighter weight than the rocks and other high density objects.

SUMMARY OF THE INVENTION

It is one object of the present invention to provide an improved apparatus for separating rocks and other heavy high density foreign objects from lighter weight, lower density particulate material transmitted through a conveyor tube in a simple, efficient and inexpensive manner.

Another object of the invention is to provide an improved rock trap apparatus of more efficient operation and inexpensive construction.

Still another object of the present invention is to provide such a rock trap apparatus in which the particulate material is injected through an inlet opening at the top of the conveyor tube, and a baffle plate extends beneath and across said inlet opening and terminates above the top opening of the rock trap while conveyor fluid flows above and below such baffle plate, so that the fluid under such plate flows across the top of the trap to prevent particulate material from falling into such trap.

A further object of the invention is to provide a pneumatic conveyor system employing such rock trap apparatus and having a feeding means for injecting particulate material through an inlet opening in the top of the conveyor tube without breaking the air seal of the conveyor tube, so that the rocks and other foreign objects strike the longitudinal baffle plate and roll off such plate into the rock trap while the particulate material is blown past such rock trap without entering it.

An additional object of the invention is to provide such a rock trap apparatus with a discharge means for removing rocks and other foreign material from the rock trap without breaking the air seal of the conveyor tube.

BRIEF DESCRIPTION OF DRAWINGS

Other objects and advantages of the present invention will be apparent from the following detailed description of preferred embodiments thereof and from the attached drawings of which:

FIG. 1 is a side elevation view of a conveyor system employing the rock trap apparatus of the present invention;

FIG. 2 is an enlarged view of a portion of the rock trap apparatus of FIG. 1 with parts broken away for clarity;

FIG. 3 is a vertical section view taken along the line 3—3 of FIG. 2; and

FIG. 4 is a vertical section view taken along the line 4—4 of FIG. 1 showing the general design of a suitable rotary feeding means.

DESCRIPTION OF PREFERRED EMBODIMENT

As shown in FIG. 1, a conveyor system in accordance with the present invention includes a hollow conveyor tube 10, which may be in the form of a cylindrical pipe having one end connected to a blower fan 12 or other source of conveyor fluid which transmits the conveyor fluid, such as air, in the direction of arrows 14 to the other end of such tube. Particulate material 16, such as wood chips, are injected through an inlet opening 18 at the top of a horizontal portion of the conveyor tube 10 by a feeder 20 positioned above such inlet opening at the bottom of a hopper 22, holding such particulate material. The feeder 20 may be a rotary feeder of the type shown in U. S. Pat. No. 2,162,392 of Solomon et al., granted June 13, 1939, or of the air lock type shown in FIG. 4. Thus, feeder 20 includes a rotary paddle wheel member including a plurality of radially extending paddles 24 attached to a common drum 25 mounted on a drive shaft 26 which rotates to feed the particulate material 16 through such feeder at a regulated rate in the direction of arrows 28. The paddles 24 may be provided with adjustable rubber tips 30 which make a sliding air tight seal with the interior surface of the feeder housing 32. As a result, the feeder 20 forms an air lock across the inlet opening 18 to the conveyor tube 10, so that the air 14 does not blow upward through the feeder into the hopper.

A longitudinal baffle plate 34 is mounted within the conveyor tube 10 beneath the inlet opening 18 through which the particulate material is injected into such conveyor tube. The baffle plate extends across the inlet opening 18 and terminates at its rear or downstream end above the front edge of the top opening of a rock trap 36, as shown in FIG. 2. The rock trap 36 includes a sloping front wall portion 38 extending at an acute angle to the side of the conveyor tube 10 and a rear wall portion 40 which extends substantially perpendicular to the side of such tube. The top edges of the front and rear walls 38 and 40, respectively, are provided with oval and circular cutouts to accomodate the conveyor tube 10 and are welded to the outer surface of such conveyor tube, as is the upper edge of each of the two side wall portions 42 of such rock trap. As a result, the air or other conveyor fluid 14 transmitted through the conveyor tube 10 flows above and below the baffle plate 34. The fluid 14 flowing below the baffle plate flows across the top opening 44 of the rock trap 36 to prevent particulate material from falling into such rock trap. The top opening 44 of the rock trap is formed by an aperture in the bottom of a conveyor tube having a front edge 46 and a rear edge 48. Rocks 50 and other heavy foreign objects in the particulate material 16 transmitted by the feeder 20 through the inlet opening 18 of the tube 10, strike the baffle plate 34 and roll across the plate until they reach the rear end 52 of such plate where they fall downward into the rock trap 36 through its top opening 44. The rear end 52 of the baffle plate terminates above the top opening 44 and in front of its rear edge 48 to enable the rocks to fall directly into the rock trap along a curved trajectory. Of course, the trajectory of the rocks is rearward, as well as downward, due to the air flow 14 and depends upon many factors, including the weight of the rock and the speed of the air flow, which oridinarily is between 90 and 110 feet per minute.

In the preferred embodiment, the baffle plate 34 is positioned at the midpoint of a horizontal section of the conveyor tube 10 and extends through the longitudinal axis of such tube and substantially parallel thereto. However, it is possible to provide a small angle between the baffle plate and the axis of the tube and such tube need not be exactly horizontal. Also, the spacing between the baffle plate and the bottom of such conveyor tube may be changed if a corresponding adjustment is made in the spacing between the rear edge 52 of the baffle plate 34 and the rear edge 48 of the top opening 44 of the rock trap. It has been found that for proper operation at the above air speed, the length of the top opening 44 of the rock trap must be at least twice the spacing between the baffle plate 34 and the bottom of the conveyor tube 10. Thus, in the preferred example given, with a conveyor tube diameter of 1 foot 4 and ½ inches, the spacing between the baffle plate 34 and the bottom of a conveyor tube 10 is about 8 and ¼ inches, while the horizontal distance between the rear edge 52 of the baffle plate 40 and the rear edge 48 of the top opening 44 of the rock trap is about 1 foot 10 inches.

Any suitable discharge means can be employed at the bottom of the rock trap for discharging rocks and other foreign matter which accumulate in such trap. However, it is preferred that such discharge means is of the air lock type which does not break the air seal of the conveyor tube 10 so that the pneumatic conveyor can continue to operate during discharge without blowing particulate material out through the bottom of the rock track. One such air lock discharge means 54 includes a pair of stacked sliding metal plates or gates 56 and 58. As shown in FIG. 3, the upper gate 56 is normally open in an outer position, while the lower gate 58 is normally closed in an inner position to seal the bottom of the rock trap so that rocks accumulate on the surface of the lower gate. In order to discharge the trap, the upper gate 56 is slid inwardly to close the lower end of the rock trap, while the lower gate 58 is pulled outward into an open position to dump the rocks positioned between such two gates. The gates 56 and 58 may be in the form of flat metal plates which slide on external support tracks 59 attached to the outside of the trap housing and slide inside such trap between sealing flanges 60 and 62 having rubber gaskets for air tight sealing purposes. However, it is also possible to employ rotary air lock discharge means, such as the rotary feeder 20 shown in FIG. 4, and to operate such rotary discharge means automatically by a motor actuated by a timer.

It should be noted that only the bottom of the hopper 22 is shown in FIG. 1, and that such hopper and the rotary feeder 20 are supported on a support frame 64 including four legs 66 rigidly attached to a fixed base 68. Of course the feeder 20 is also securely fastened by flanges 70 shown in FIG. 2 to the conveyor tube 10 by bolting or the like to provide an air tight seal by means of a rubber gasket between such flanges. In addition, the sliding gates 56 and 58 may operate automatically by air cylinders (not shown) rather than being provided with handles 72 for manual operation.

It will be obvious to those having ordinary skill in the art that changes may be made in the details of the above-described preferred embodiments without departing from the spirit of the invention. Therefore, the scope of the present invention should only be determined by the following claims.

We claim:

1. Apparatus for removing heavy foreign objects from light weight particulate material transmitted through a tube, in which the improvement comprises:

a conveyor tube;
  fluid means for causing a conveyor fluid to flow through said tube in one direction;
  injection means for injecting said material into said conveyor tube through an inlet opening intermediate the ends of said tube;
  trap means for removing said foreign objects from said material and out of said conveyor tube by gravity through an outlet opening in said tube, said trap means having a top opening which communicates with said outlet opening in said tube at a position beneath and downstream from said inlet opening;
  baffle means including a baffle plate extending substantially longitudinally in said tube beneath and across said inlet opening, for causing said foreign objects to strike the baffle plate and to move across said baffle plate which terminates above said top opening in front of the rear edge of said top opening so that said objects fall through the top opening into said trap means; and
  said fluid means transmitting said conveyor fluid through said conveyor tube above and below said baffle plate in said one direction, and for transmitting the fluid passing below said baffle plate across said top opening to prevent said material from falling into said trap means.

2. Apparatus in accordance with claim 1 in which the conveyor fluid is air.

3. Apparatus in accordance with claim 1 in which said trap means includes a rear wall spaced from the rear end of said plate a distance at least twice that of the spacing between said conveyor plate and the bottom of said conveyor tube.

4. Apparatus in accordance with claim 3 in which the trap means includes an inclined front wall extending forwardly at an acute angle to said axis.

5. Apparatus in accordance with claim 2 in which the injection means feeds wood particles and foreign objects including rocks into the conveyor tube through an inlet opening in the top of said tube.

6. Apparatus in accordance with claim 1 in which the trap means includes a lower portion extending outward of said tube within which said objects are collected.

7. Apparatus in accordance with claim 6 which also includes discharge means for discharging said objects from said lower portion of said trap means.

8. Apparatus in accordance with claim 1 in which said plate extends horizontally in alignment with the axis of the conveyor tube and the top opening of said trap means has a length at least as big as the diameter of said tube.

9. Apparatus in accordance with claim 1 in which the fluid means includes an air blower means connected to the input end of said tube.

10. Apparatus in accordance with claim 1 in which the injection means includes a rotary air lock feeding means for feeding said material at a controlled rate into said tube without breaking the air lock formed across said inlet opening by said feeding means.

* * * * *